Inventor
BY Joseph Scott Baynard, Jr.,
R. P. Miller
ATTORNEY

FIG. 3
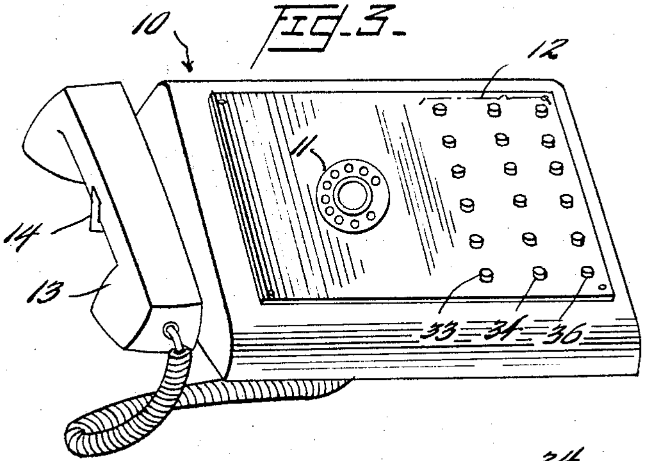
FIG. 4, FIG. 5
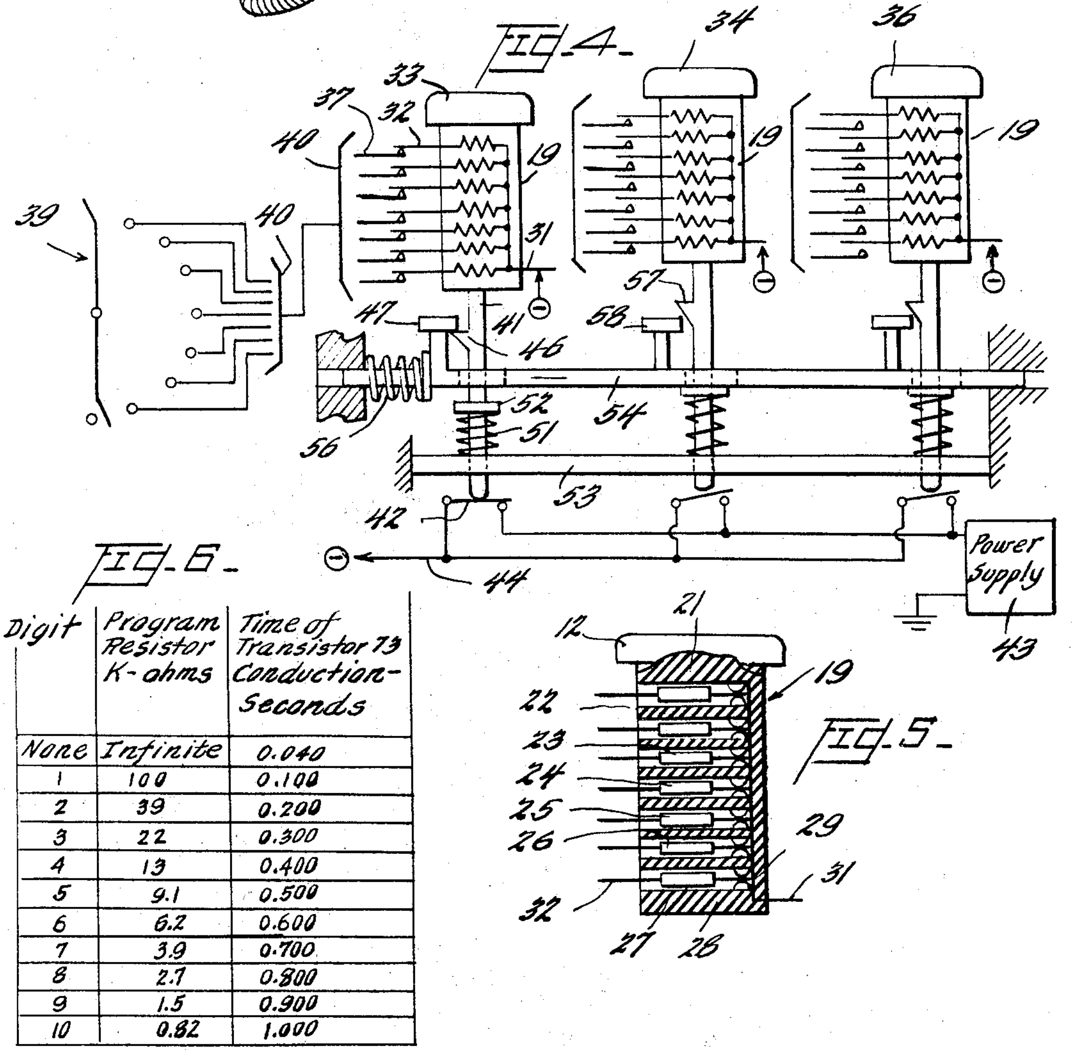
FIG. 6
| Digit | Program Resistor K-ohms | Time of Transistor 73 Conduction-Seconds |
|---|---|---|
| None | Infinite | 0.040 |
| 1 | 100 | 0.100 |
| 2 | 39 | 0.200 |
| 3 | 22 | 0.300 |
| 4 | 13 | 0.400 |
| 5 | 9.1 | 0.500 |
| 6 | 6.2 | 0.600 |
| 7 | 3.9 | 0.700 |
| 8 | 2.7 | 0.800 |
| 9 | 1.5 | 0.900 |
| 10 | 0.82 | 1.000 |

United States Patent Office 3,407,271

Patented Oct. 22, 1968

3,407,271

AUTOMATIC TELEPHONE DIALER UTILIZING A VARIABLE CONTROLLED MULTIVIBRATOR

Joseph S. Baynard, Jr., Burlington, N.C., assignor to Western Electric Company, Incorporated, New York, N.Y., a corporation of New York Filed Dec. 17, 1964, Ser. No. 419,149
9 Claims. (Cl. 179—90)

ABSTRACT OF THE DISCLOSURE

One stage of a variable multivibrator circuit controls a relaxation oscillator to impress series of pulses on a telephone line. A plurality of resistors are sequentially connected into the multivibrator circuit to control the excitation time of the multivibrator and the number of pulses produced by the relaxation oscillator.

This invention relates to an automatic telephone number dialer, and more particularly to an automatic telephone number dialer including a resistance programmed signal generator for automatically generating signals representative of a multidigit telephone number.

In the telephony art, there is a constant investigation on reducing the amount of time consumed in placing a telephone call. One area of investigation is the time consumed in dialing a telephone number, and related activities of looking up a telephone number, dialing a wrong number, relooking up the number, busy lines, and the like. A need exists for an automatic system for dialing a telephone number upon selection or operation of a single control element, such as a pushbutton. Such a system must be positive acting, yet simple and economical to manufacture while also being compatible with existing telephone apparatus. The system must also be versatile to permit a subscriber or installer to make changes to allow the dialing of different numbers.

An object of this invention is to provide a new and improved automatic telephone number dialer.

Another object is to provide a new and improved automatic telephone number dialer including a resistance programmed signal generator for automatically generating signals representative of a multidigit telephone number.

Another object of the invention resides in a multivibrator type generator which controls the impression of telephone pulses in accordance with a series of resistors which are sequentially connected into the multivibrator circuit to control its period of operation and hence the number of pulses impressed on an outgoing line.

Another object is to provide a signal generator for an automatic telephone number dialer wherein a plurality of resistors, whose resistance values are proportional to the digits of a telephone number, are automatically and sequentially connected to the signal generator to control the number of cycles of operation of an oscillator which controls the impression of series of pulses which are representative of the digits to be dialed.

With these and other objects in view, an automatic telephone number dialer illustrating certain features of the invention includes a multivibrator device having a first operating state of a fixed period or time duration followed by a second operating state of a variable time duration. Facilities responsive to the cessation of the second state (or to the simultaneous initiation of the first state) advance one of a plurality of delay elements into connection with the device during the first state. Each delay element has a parameter which is proportional to a time duration. At the cessation of the first state (or simultaneous initiation of the second state), the second state is operative for a time duration proportional to the delay element parameter. During the subsequent first state, the facilities advance the next delay element into connection with the device. This cycle continues until all of the delay elements have been connected to control the successive time durations of the second states.

More particularly, the automatic dialer of the invention includes a multivibrator circuit having a fixed time duration of non-conduction followed by a variable time duration of conduction. Facilities responsive to the initiation of the non-conducting duration (or simultaneous cessation of the conducting state) connect one of a plurality of program resistors to the multivibrator. Each program resistor has a resistance value proportional to a time duration and to a digit of a telephone number. At the cessation of a non-conducting duration, the multivibrator is rendered conductive for a time duration proportional to the resistance value of the program resistor connected thereto. The conducting multivibrator controls a pulse producer to generate a train of pulses representative of the resistance value of the program resistor connected to the multivibrator. During the subsequent non-conducting duration of the multivibrator, the facilities advance the next program resistor into connection with the multivibrator. This next program resistor then determines the conducting duration of the multivibrator which controls the pulse producer to produce a train of pulses representative of this program resistor. This cycle continues until all of the resistors have been connected to the multivibrator to control successive time durations of the conducting state.

Other objects and advantages of the invention will become apparent by reference to the following detailed specification and drawings, wherein:

FIG. 3 is a pictorial representation of a commercially available pushbutton type telephone apparatus into which the automatic telephone number dialer of this invention may be incorporated;

FIG. 4 is a schematic diagram showing the operation of some of the pushbuttons of the apparatus shown in FIG. 3;

FIG. 5 is an enlarged view of one of the pushbuttons showing a resistor module connected to it; and FIG. 6 is a table correlating digits of a telephone number with illustrative resistance values for program resistors and time duration of conduction of a multivibrator circuit shown in FIG. 1.

Figures 1, 2:
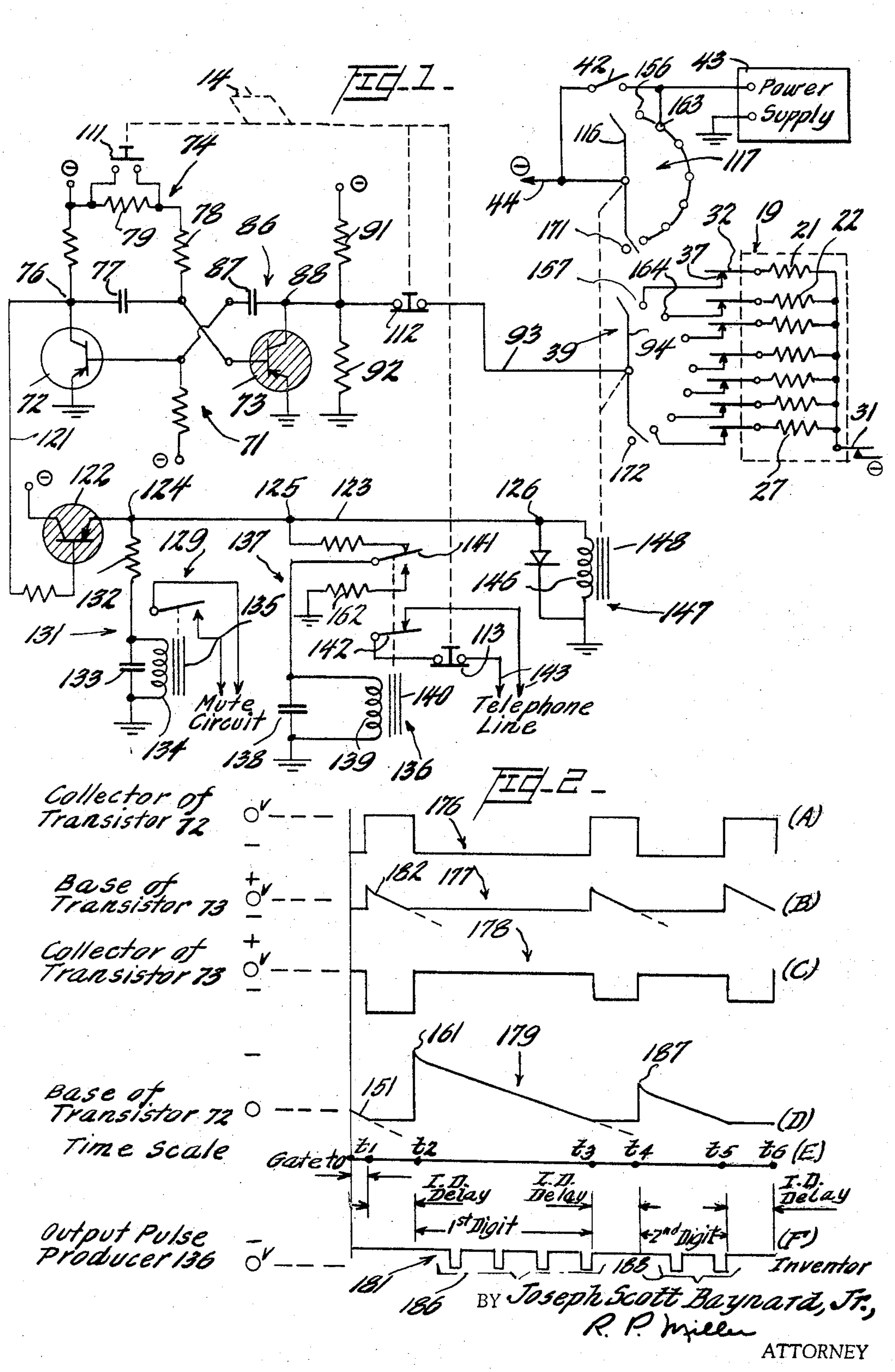
FIG. 1 is an electrical schematic diagram of the automatic telephone number dialer incorporating certain principles of the invention.
FIG. 2 is a waveform diagram showing the electrical conditions which exist at various points of the circuit of FIG. 1 during the operation thereof.

Referring first to FIG. 3, there is pictorially shown a telephone set 10 manufactured and sold by the Western Electric Company, Inc., under the trademark "Call Director." Telephone set 10 includes the usual rotary dial 11 for manually dialing a telephone number in a conventional manner, and also includes a plurality of pushbuttons 12 which enable the telephone set to operate as an intercommunication system.

The automatic dialer of this invention can be effectively incorporated into the housing of a "Call Director" telephone set 10 without any external modifications of it. The "Call Director" telephone set may be internally modified so that the lifting of its handset 13 from its cradle 14, and the subsequent depression of any pushbutton 12 will automatically complete a telephone call to a desired intraoffice number, local or long distance number, or the like. The pushbuttons 12 may be conveniently labeled with a telephone number, a person's name, or such words as fire, police, warehouse, or the like.

Pushbuttons 12 are removably located in sockets (not shown) of telephone set 10. Each pushbutton 12 has a resistor module 19 attached thereto. More particularly, in FIG. 5 each resistor module 19 has mounted therein a plurality of program resistors 21–27, each of which has a resistance value proportional to or representative of a digit of a desired telephone number. Each program resistor 21–27 has a first end or first lead 28 which is connected by a spring clip 29 (or some other convenient quick-connect means) to a common lead 31 and a free end or second lead 32 extending out of resistor module 19.

For illustrative purposes only, each resistor module 19 has seven program resistors 21–27 contained therein representing a seven digit telephone number. It will be understood that resistor module 19 may contain ten program resistors for direct distance dialing (which presently requires ten digits), or any number of program resistors necessary to represent any single or multidigit telephone number.

The resistor module arrangement above described facilitates the convenient programming or reprogramming of resistor module 19 for a telephone number. A subscriber need only have a suppply of program resistors of various resistance values representing the digits zero to nine and a supply of resistor modules 19. Since each program resistor contained in resistor module 19 is conveniently mounted on its first end 28 by spring clip 29, the subscriber, in order to reprogram the resistor module, removes the program resistors representing the old telephone number and inserts new program resistors to program the resistor module for a new telephone number. The subscriber then inserts pushbutton 12 and the resistor module 19 attached thereto into a socket in telephone set 10.

With reference to FIG. 4, there is shown three pushbuttons 33, 34, and 36 representative of the plurality of pushbuttons 12. The free ends 32 of program resistors 21–27 are located opposite a plurality of spring contacts 37. Spring contacts 37 are insulatively mounted to the housing of telephone set 10 and correspond in number to the maximum number of resistors which can be mounted in a resistor module 19. Each spring contact 37 is connected to a terminal of a stepping switch 39 by a wire or lead of a cable or harness 40, diagrammatically represented by a bracketed line.

Only pushbutton 33 will be described since all of the pushbuttons 12 are identical. When pushbutton 33 is in a socket, its bottom abuts a vertical bar 41. When pushbutton 33 is fully depressed, the vertical bar 41 engages and closes a switch 42. The closure of switch 42 completes a circuit from a power supply 43 to apply power over a lead 44. Power is represented by an encircled negative battery symbol. Vertical bar 41 is provided with a lateral projection 46 which is latched under a holding cam 47 when pushbutton 33 is momentarily fully depressed and then released. A spring 51 is mounted between a collar 52 which is secured to vertical bar 41 and a support bar 53 which is secured to the housing. Vertical bar 41 extends through openings in support bar 53 and a slide 54 which is mounted on the telephone set housing.

Holding cam 47 is mounted on slide 54 which is biased by a spring 56 toward the right as shown in FIG. 4. When any other pushbutton 12, for example pushbutton 34, is depressed, its lateral projection 57 moves a holding cam 58 and slide 54 to the left to disengage lateral projection 46 from holding cam 47. Spring 51 expands between collar 52 and support bar 53 to return pushbutton 33 to its undepressed or original position. When pushbutton 34 is released, its lateral projection 57 is latched under holding cam 58.

*Circuit description and operation*

Referring to FIG. 1, there is shown an astable or free-running multivibrator circuit 71 having a first PNP transistor 72 and a second PNP transistor 73.

The period or time of conduction of transistor 72 (or non-conduction of transistor 73) is fixed. This period is determined by an RC network 74 which is connected between power and junction point 76 connected to the collector of transistor 72. RC network 74 includes a capacitor 77 having one end thereof connected to junction point 76 and includes serially connected resistors 78 and 79 connected between the other end of capacitor 77 and power.

The period of conduction of transistor 73 (or non-conduction of transistor 72) is variable and is determined by an RC network 86. RC network 86 includes a capacitor 87 connected between the base of transistor 72 and a junction point 88 which is connected to the collector of transistor 73. RC network 86 also includes resistors 91 and 92 which have one end connected to the junction point 88. Resistors 91 and 92, respectively, have their other end connected to power and to ground. RC network 86 further includes whichever program resistor 21–27 of resistor module 19 is connected through a sweep arm 94 of stepping switch 39 over lead 93 to junction point 88.

In the operation of the automatic dialer of this invention, a subscriber first lifts handset 13 from cradle 14 of telephone set 10 (see FIG. 3). This action opens contacts 111, and closes contacts 112 and 113. Next, the subscriber depresses the desired pushbutton, for example pushbutton 33, to momentarily close switch contact 42 (see FIGS. 1 and 4) to initiate the automatic dialer to dial the telephone number represented by pushbutton 33.

Referring to FIG. 1, upon the momentary closure of switch 42 by the depression of a pushbutton 12 power is supplied over lead 44 to the terminals adjacent to the negative power symbols. Power supply 43 thus bypasses sweep arm 116 of a stepping switch 117 and applies power to multivibrator circuit 71. The parameters of multivibrator circuit 71 are as such that conduction of transistor 73 is initially favored when power is applied. Cross-hatching indicates that a transistor is conducting. Transistor 73 conducts for a very short time duration, $t_0$–$t_1$ (see lines C and E, FIG. 2). This time, $t_0$–$t_1$, is called the gate time because it is determined by capacitor 87 and resistors 91 and 92 only, since sweep arm 94 of stepping switch 39 is open circuited and not connected to any program resistor 21–27.

Simultaneously with the initial conduction of transistor 73, transistor 72 is rendered non-conductive. Power is applied through junction point 76 over a lead 121 to the base of a third PNP transistor 122 to render it conductive. Power is thus applied from the collector of transistor 122, which behaves as a switch, over a lead 123 to junction points 124, 125, and 126 during the time that transistor 73 is conductive.

When transistor 122 is conductive, a circuit is completed from junction 124 to a circuit 129 for operating the muting circuit (not shown) of handset 13. Circuit 129 includes a series RC network 131 comprising a resistor 132 and a capacitor 133. A relay 134, having an armature connected to a muting contact 135, is connected across capacitor 133.

Capacitor 133 charges during the time that transistor 122 is conductive. After a predetermined time, which is determined by RC network 131 including the capacitor 133, the relay 134 operates to close contact 135. Closure of contact 135 completes a muting circuit for the handset 13 to prevent dialing pulses from being applied to the handset receiver. This action is well known to those skilled in the telephony art and need not be further described. However, the initial conduction of transistors 73 and 122 is of too short a time duration to charge capacitor 133 sufficiently to operate the relay 134. Thus, contact 135 remains in the open position, as shown in FIG. 1, when transistors 122 and 73 initially conduct during the gate time.

When transistor 122 is conducting, a circuit is also completed from junction point 125 to a pulse producing circuit 136. Pulse producing circuit 136 includes an RC network 137 which comprises a capacitor 138 connected through a contact 141 in series with a resistor which is connected to junction point 125. Capacitor 138 is connected in parallel with a relay 139 which has an armature 140. Armature 140 is connected to operate contact 141 and contact 142 which is connected in series with contacts 113.

Capacitor 138 charges during the time the transistor 122 is conductive. After a predetermined time, which is determined by RC network 137, a sufficient charge accumulates in capacitor 138 to operate relay 139 to open contacts 141 and 142 from the positions shown in FIG. 1. The opening of contact 142 breaks a circuit connected to a telephone line 143. Normally in the telephony art, an operating voltage is connected to one of the leads of telephone line 143. Therefore, when contact 142 is opened, a pulse (or no voltage) is impressed over telephone line 143 (see line F, FIG. 2). However, transistors 73 and 122 conduct for too short a time during the gate time to charge capacitor 138 sufficiently to operate relay 139. Thus, contacts 141 and 142 remain in the position shown in FIG. 1, and no pulse is generated over telephone line 143.

When transistor 122 is conducting, a circuit is also completed from junction point 126 to energize a relay coil 146 of a conventional, backward-action type, stepping relay 147 having an armature 148. A backward-action stepping switch is characterized in that upon energization of its relay coil, its armature is not actuated; but upon de-energization of its relay coil, its armature is operated. When transistors 73 and 122 are initially rendered conductive by the momentary closure of switch 42, relay coil 146 is energized but armature 148 is not operated. When transistors 73 and 122 are subsequently rendered non-conductive by multivibrator action, coil 146 is de-energized and armature 148 is operated to step sweep arms 116 and 94 to the first terminal 156 and 157, respectively, of stepping switches 117 and 39, respectively.

When switch 42 is momentarily closed by the full depression and release of a pushbutton 12 to render transistor 73 initially conductive, capacitor 87 charges to a relatively low potential 151 (indicated at $t_0$ on line D of FIG. 2). Within a relatively short time, $t_1$–$t_0$, capacitor 87 discharges sufficiently to render transistor 73 non-conductive and transistor 72 conductive. At this point, $t_1$, transistor 122 is also rendered non-conductive. During the following time interval, $t_1$–$t_2$, stepping relay 147 is actuated to step sweep arms 116 and 94 to the first terminals 156 and 157, respectively.

With sweep arm 116 connected to terminal 156, switch 42 is bypassed and power supply 43 is connected directly through the stepping switch 117 to lead 44. Transistor 72 remains conductive for a fixed time duration, $t_1$–$t_2$, which is determined by RC circuit 74. This fixed time duration of conduction of transistor 72 (or non-conduction of transistor 73) is called the "interdigital delay" and is a relatively short duration, $t_3$–$t_4$ and $t_5$–$t_6$, (see lines A and E of FIG. 2).

Although transistor 73 has been described as being rendered conductive first when switch 142 is momentarily closed, it is immaterial whether transistor 73 or transistor 72 is rendered conductive first. In an actual embodiment of the automatic dialer, the gate time $t_1$–$t_0$ is on the order of 0.04 second and the interdigital delay time is on the order of 0.3 second. Therefore, when transistor 73 is rendered conductive first, on the order of between 0.04 second and 0.34 second is consumed before power supply 34 is connected directly to lead 44; that is, the gate time ($t_0$–$t_1$) plus that portion of the interdigital delay ($t_1$–$t_2$) which is consumed before sweep arm 116 is stepped to terminal 156. If transistor 72 is rendered conductive first, on the order of between 0.34 second and 0.64 second is consumed before power supply 43 is connected directly to lead 44; that is, the interdigital delay, plus the gate time ($t_0$–$t_1$), plus that portion of the interdigital delay ($t_1$–$t_2$) which is consumed.

Thus, power is not interrupted from the circuit of FIG. 1 by the release of a pushbutton 12 which permits switch 42 to open since power is connected directly to lead 44 in a maximum time of 0.64 second. A subscriber would ordinarily hold a pushbutton 12 fully depressed for at least a full second, more than ample time to operate stepping switch 117 to connect power directly to lead 44. To insure that contact 42 is not opened until power is connected directly to lead 44, a mechanical dashpot may be connected to vertical bar 41 of pushbuttons 12 to delay the opening of switch 42 for a full one second.

With sweep arm 94 connected to first terminal 157, the first program resistor 21 is connected from terminal 157, through sweep arm 94, over lead 93 to junction point 88. Program resistor 21 is now connected in parallel with resistor 91 and in series with resistor 92. Each program resistor 21–27 has a resistance value less than the resistance value of resistor 91. The parallel combination of any program resistor 21–27 and resistor 91 has a resistance value less than resistor 91. Thus, the RC time of RC network 86 will be increased when a program resistor 21–27 is connected to junction point 88.

At the end of the first interdigital delay, $t_1$–$t_2$, transistor 73 is again rendered conductive and transisor 72 non-conductive. During the interdigital delay, capacitor 87 charges very rapidly to a relatively large potential 161 (line D of FIG. 2) which is proportional to the digit represented by program resistor 21. Potential 161 on capacitor 87 maintains transistor 73 conductive for the period $t_2$–$t_3$ which is relatively long with respect to the gate time and the interdigital delay.

During the interval, $t_2$–$t_3$, transistor 122 is rendered conductive to complete the circuits connected to junction points 124, 125, and 126.

During interval $t_2$–$t_3$, stepping relay 147 is energized but does not step sweep arms 116 and 94 to the next terminals. Sufficient charge accumulates in capacitor 133 to operate relay 134, thereby closing muting contacts 135. Closure of muting contacts 135 shorts out the muting circuit (not shown) of handset 13 to preclude the impression of subsequent dialing pulses on the circuits (not shown) located in the handset.

During interval $t_2$–$t_3$, sufficient charge also accumulates in capacitor 138 to operate relay 139 of pulse producing circuit 136. This action opens the contacts 141 and 142 from the position shown in FIG. 1, thereby permitting capacitor 138 to discharge rapidly through a resistor 162. During the period that contacts 141 and 142 are opened, a pulse is produced over telephone lines 143. Upon the discharge of capacitor 138, relay 139 releases the contacts 141 and 142 to reconnect capacitor 138 to junction point 125. Capacitor 138 again charges sufficiently to operate relay 139. This charging and discharging cycle of capacitor 138 continues for as long as transistors 73 and 122 remain conductive to produce a number of pulses proportional to or representative of (1) the resistance value of program resistor 21 and (2) the first digit of the telephone number being dialed (see line F, FIG. 2).

At time $t_3$, capacitor 87 discharges sufficiently to render transistor 72 conductive and transistor 73 non-conductive. During the interdigital delay $t_3$–$t_4$, stepping relay 147 then steps sweep arms 116 and 94 to the second terminals 163 and 164, respectively, of stepping switches 117 and 39, respectively. This action connects the second program resistor 22, which is connected to terminal 164, to junction point 88. At the end of the second interdigital delay, $t_4$, transistor 72 is rendered non-conductive and transistor 73 is rendered conductive for a period of time indicative of resistor 22 which represents the second digit of the telephone number being dialed. Pulse producing circuit 136 then produces a number of pulses over telephone line 143 indicative of the second digit.

This cycle of operation continues until the sweep arms 116 and 94 have sequentially connected the remaining resistors 23–27 to junction point 88, thereby controlling the periods of conduction of transistor 73 and the impression of pulses over telephone lines 143. After the last group of pulses, representative of resistor 27. has been impressed on telephone line 143, stepping relay 147 steps sweep arms 116 and 94 to the last terminals 171 and 172, respectively, of stepping switches 117 and 39. Power supply 43 is thus disconnected from line 44 to de-energize the automatic telephone number dialer.

If, during the course of a dialing cycle of the automatic dialer, a subscriber hangs up telephone set 10 by depressing cradle 14, contacts 112 and 113 are opened and contact 111 is closed. The opening of contact 112 disconnects resistor module 19 from junction point 88. Thus, the period of conduction of transistor 73 in this situation is the gate time which is determined solely by resistors 91 and 92. The closure of contact 111 removes resistor 79 from RC network 74. This reduces the conduction time of transistor 72 to approximately 0.1 second. Multivibrator circuit 71 now cycles very rapidly on the order of 0.14 second for each remaining digit. Stepping relay 147 is thereby operated very rapidly to step sweep arms 116 and 94 over the terminals of stepping switches 117 and 94, respectively. The automatic dialer cycles and is returned to its quiescent condition without the impression of any pulse over telephone line 143, since contact 113 is opened when cradle 14 is depressed.

*Timing diagram*

Referring to FIG. 2, there is shown a timing diagram relating the waveforms of the voltage at the collector of transistor 72 or junction point 76 (waveform 176, line A), the voltage at the base of transistor 73 or across capacitor 77 (waveform 177, line B), the voltage at the collector of transistor 73 or junction point 88 (waveform 178, line C), the voltage at the base of transistor 72 or across capacitor 87 (waveform 179, line D), and the pulse output applied to telephone line 143 for the first two digits, 186 and 188, of a multidigit telephone number (waveform 181, line F). Line E is the time reference scale.

When switch 42 is initially closed at $t_0$, transistor 73 is rendered conductive for the gate time which consumes the interval $t_0$–$t_1$. Capacitor 87 charges to the initial potential 151. During the gate time $t_0$–$t_1$, transistor 122 is conductive, but for an interval too short to charge capacitor 138 sufficiently to operate relay 139; thus, no pulse appears on telephone line 143 during the gate time.

At time $t_1$, capacitor 87 has discharged sufficiently to render transistor 72 conductive and capacitor 77 charges to the potential 182. Transistor 72 remains conductive for the interdigital delay ($t_2$–$t_1$) which is a fixed period. During the interdigital delay, stepping relay 147 is operated to step sweep arm 94 to connect the first program resistor 21 to junction point 88 to control the period of conduction of transistor 73.

At time $t_2$, capacitor 77 has discharged sufficiently to permit transistor 73 to be rendered conductive. During the switching of conduction states of transistors 72 and 73, capacitor 87 is charged to the relatively high potential 161. Transistor 122 is rendered conductive substantially simultaneously with transistor 73 and both of these transistors remain conductive for the interval $t_2$–$t_3$. If the first program resistor 21 has a resistance value representing the digit four, relay 139 of pulse producing circuit 136 operates four times to impress four pulses 186 on telephone line 143.

At time $t_3$, transistor 73 is rendered nonconductive again. Transistor 72 is rendered conductive and remains conductive for the interdigital delay $t_3$–$t_4$, during which the second program resistor 22 is connected to junction point 88. Capacitor 87 charges to the potential 187. Transistor 73 remains conductive for a time duration representative by resistors 22. If the second program resistor 22 represents the digit two, relay 139 operates two times to impress two pulses 188 on telephone line 143. This cycle of operation continues until the sweep arms 116 and 94 are stepped to the last terminals 171 and 172, respectively, of stepping switches 117 and 39, respectively.

The automatic dialer has been described employing a seven digit telephone number. The automatic dialer can readily accommodate any number of digits. For example, in some offices a four digit code is used for intraoffice communication. In such a situation, only four program resistors 21–24 are mounted in a resistor module 19 and the remaining program resistor positions are blank or open circuited. The system operates as previously described for the first four digits. When sweep arm 94 arrives at the fifth program resistor position, it encounters an open circuit or an infinite resistance condition, whereupon the automatic dialer produces short gate pulses so that no dialing pulses are impressed on the line. The sweep arm 94 will thus rapidly step to the last terminal 172.

Referring to FIG. 6, there is shown a table correlating (1) the digit that a particular program resistor represents, (2) the resistance value of the particular program resistor, and (3) the time duration consumed while transistor 73 is conductive. The automatic dialer of this invention consumes less or at least no more than the time to manually dial a telephone number. For example, for a seven digit number composed of seven "5's," the automatic dialer consumes approximately 0.8 second per digit (0.5 second conduction time for transistor 73 plus 0.3 second interdigital delay) or approximately 5.6 seconds. This is less than the manual 7.0 seconds (1.0 second average per digit to manually dial this number). In addition, a significant amount of time is saved in looking up of a telephone number, actually manually dialing, manually dialing a wrong number, relooking up of a telephone number, busy lines, or the like.

The resistance values for program resistors representing digits depicted in FIG. 6 are illustrative only. Other resistance values may be chosen to render transistor 73 conductive for different time intervals depending on the speed of operation of the mechanical stepping relays and the parameters of the circuit elements.

It is to be understood that the above-described automatic telephone number dialer is illustrative of the principles of the invention and other embodiments may be devised without departing from the scope of the invention.

What is claimed is:

1. In a device for producing signals indicative of serial indicia, the combination of:

- a plurality of electrical elements, each element having an electrical parameter value indicative of a selected time duration and representative of one of the indicia,
- means having first and second states of operation for producing a signal during the second state,
- means for changing the signal producing means from its first to its second state after a fixed time duration,
- switching means for sequentially connecting each of the plurality of elements into the signal producing means to switch the signal producing means from its second to its first state after a time duration determined by the value of a connected element, and
- means operated by the signal producing means while in its first state for operating the switching means.

2. In an automatic telephone dialer for impressing a series of pulses on a telephone line,

- a normally quiescent oscillator means for impressing pulses on said telephone line,
- a multivibrator having two stages interconnected through a pair of delay circuits,
- a series of resistors,
- means rendered effective following each operation of a first stage of said multivibrator for sequentially connecting another of said resistors into a first delay circuit running between the first stage and the second stage, and means operated by said first stage for operating said oscillator means.

3. In a device for generating a series of pulses representative of the digits of a number, normally quiescent pulse generating means, a multivibrator circuit having a fixed non-conductive period and a selectively variable conductive period, a plurality of resistors sequentially connectable to the multivibrator circuit, each resistor having a resistance value representative of a digit for controlling the duration of the conductive period for a time corresponding to the resistance value, means for selectively connecting a resistor into the multivibrator circuit during the fixed non-conductive period, and switch means responsive to the initiation of the conductive period for operating the generating means to produce a number of pulses representative of the resistance value of the particular resistor connected to the multivibrator circuit, and responsive to the termination of the conductive period for enabling the selective connecting means to connect the next resistor to the multivibrator circuit during the fixed non-conductive period.

4. In an automatic telephone dialer for impressing a sequence of series of pulses on a line, which sequence is indicative of a telephone number, a relay having a contact in said telephone line, a normally unoperated oscillator for successively operating said relay, a multivibrator circuit having a first stage connected to release said oscillator to successively operate said relay, and a second stage connected to hold said oscillator from operation, a plurality of resistors indicative of digits of a telephone number, a delay circuit interconnecting the first and second stages of said multivibrator for controlling the duration of operation of said first stage, means controlled by the second stage assuming a succession of unoperated stages for successively connecting said resistors into said delay circuit, and means for initiating operation of said multivibrator.

5. In a device for controlling the production of pulses representative of the digits of a number, a multivibrator circuit having a first electronic device and a second electronic device, the first device being conductive for a fixed period followed by the second device being conductive for a variable period, a plurality of resistors sequentially connectable to the second device, each resistor having a resistance value representative of one of the digits for controlling the conductive period of the second device for a time corresponding to the digit, means for switching a resistor into connection with the second device during the fixed conductive period of the first device, means responsive to the initiation of conduction of the first device for actuating the switching means to advance a resistor into connection with the multivibrator circuit during the fixed conductive period of the first device, means for generating pulses, and means rendered effective by the initiation of conduction of the second device following the cessation of conduction of the first device for enabling the generating means to produce a number of pulses representative of the digit corresponding to the particular resistor connected to the second device during its conduction.

6. In an automatic telephone number dialer, a device for controlling the generating of pulses representative of digits, comprising:

an astable multivibrator circuit having a first and a second electronic device, a plurality of resistors sequentially connectable to the second device, each resistor having a resistance value representative of a digit of the telephone number, means for initially rendering the second device conductive, means responsive to the cessation of the initial conductive period of the second device and during the subsequent fixed conductive period of the first device for connecting the first resistor to the second device to control the conductive period thereof, the connecting means thereafter connecting the next resistor during each subsequent conductive period of the first device, and an oscillator responsive to the second and subsequent conductive periods of the second device for producing a number of pulses indicative of the digit represented by the resistance value of the particular resistor connected to the second device.

7. In an automatic telephone number dialer, a device for controlling the production of pulses representative of digits, comprising:

means for producing pulses, an astable multivibrator circuit having a first transistor biased to conduction for a fixed period and a second transistor being biased to conduction for variable periods, a plurality of resistors, each resistor having a resistance value representative of one of the digits, each resistor being individually connectable to the collector circuit of the second transistor, each resistor controlling the conduction period of the second transistor when so connected, a stepping switch for sequentially advancing the resistors into connection with the collector circuit of the second transistor, means for initially rendering the second transistor conductive, a stepping relay responsive to the cessation of initial conduction of the second transistor for actuating the stepping switch to advance the first resistor into connection with the collector circuit of the second transistor during the fixed period of conduction of the first transistor, the stepping relay thereafter connecting a next resistor to the collector circuit of the second transistor during the subsequent conductive periods of the first transistor, and transistor switch means rendered conductive by the initiation of conduction of the second transistor following cessation of conduction of the first transistor for enabling the producing means to produce a number of pulses representative of the digit corresponding to the particular resistor connected to the collector circuit of the second transistor during its conduction.

8. In a telephone instrument having facilities for producing pulses representative of digits, the combination with the instrument of an automatic telephone number dialer, comprising:

an astable multivibrator circuit having a first and a second transistor, the first transistor biased to conduction for a fixed period determined by a first resistance-capacitance network connected to its collector circuit, the second transistor being biased to conduction for variable periods determined by a second resistance-capacitance network connected to its collector circuit, a plurality of program resistors, each resistor having a resistance value representative of one of the digits, each resistor being individually connectable to the second resistance-capacitance network, each resistor controlling the conduction period of the second transistor when so connected, a stepping switch for sequentially advancing the resistors into connection with the second resistance-capacitance network, means for initially rendering the second transistor conductive, a stepping relay responsive to the cessation of conduction of the second transistor for actuating the stepping switch to advance the first resistor into connection with the second resistance-capacitance network during the fixed period of conduction of the first transistor, the stepping relay thereafter connecting a next resistor to the second resistance-capacitance network during the subsequent conductive periods of the first transistor, and transistor switch means rendered conductive by the initiation of conduction of the second transistor following cessation of conduction of the first transistor for enabling the producing means to produce a number of pulses representative of the digit corresponding to the particular resistor connected to the second resistance-capacitance network during the conductive period of the second transistor.

9. In a device for producing signals indicative of serial indicia as defined in claim 1 and which includes, oscillator means operated by the signal producing means in its second state for producing a series of pulses indicative of the serial indicia.

References Cited

FOREIGN PATENTS 1,057,177 5/1959 Germany.

KATHLEEN H. CLAFFY, *Primary Examiner.*

A. H. GESS, *Assistant Examiner.*